UNITED STATES PATENT OFFICE.

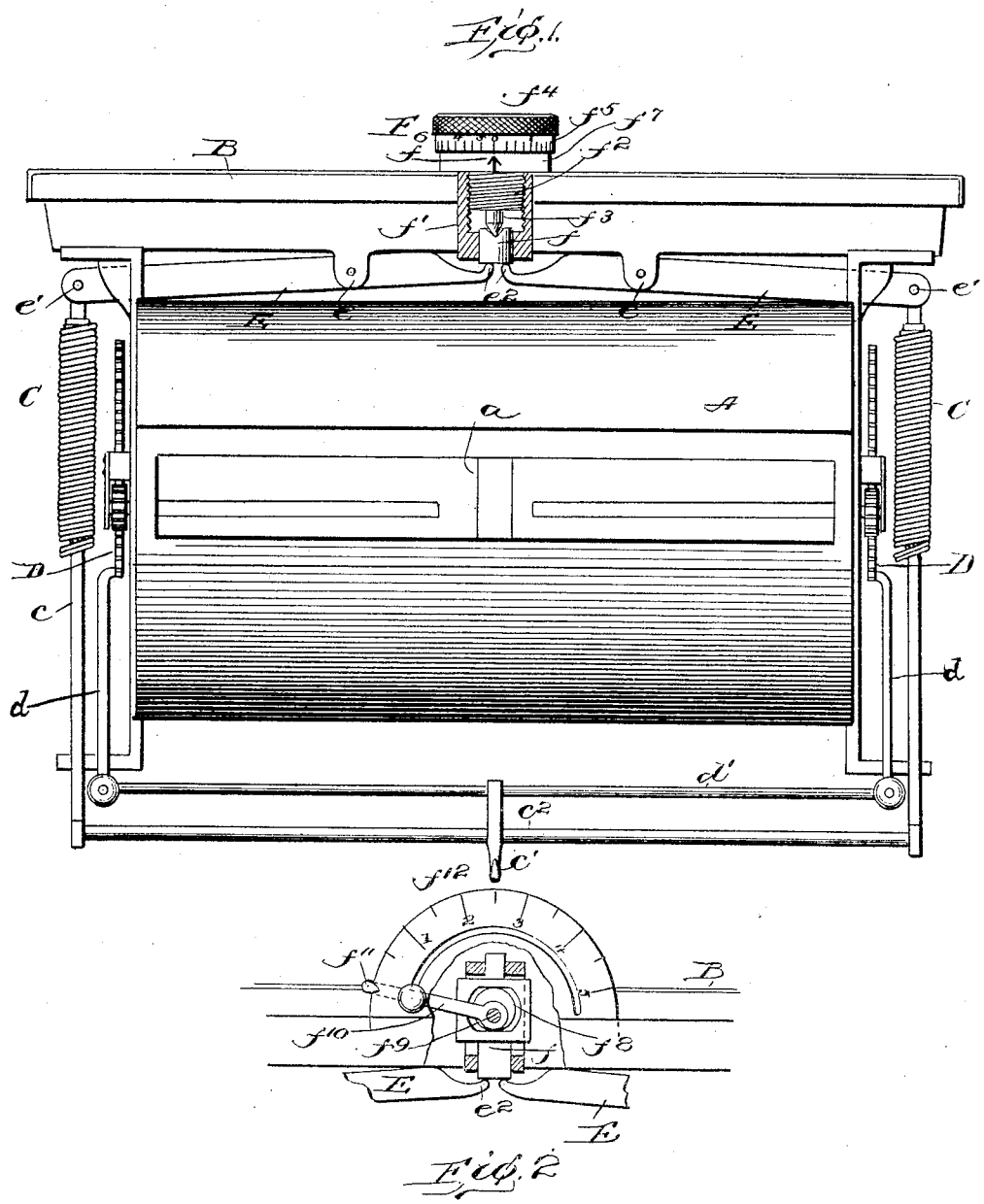

WILLIAM H. SANDERSON, OF DAYTON, OHIO, ASSIGNOR TO THE COMPUTING SCALE COMPANY, OF DAYTON, OHIO, A CORPORATION OF OHIO.

SPRING-BALANCE SCALE.

No. 804,885.  Specification of Letters Patent.  Patented Nov. 21, 1905.

Application filed December 18, 1903. Serial No. 185,744.

*To all whom it may concern:*

Be it known that I, WILLIAM H. SANDERSON, a citizen of the United States, residing at Dayton, in the county of Montgomery and State of Ohio, have invented certain new and useful Improvements in Spring-Balance Scales; and I do hereby declare the following to be a full, clear, and exact description of the same, reference being had to the accompanying drawings, forming a part of this specification, and to the letters of reference marked thereon.

This invention relates to scales in which a spring or system of springs is used to measure weight; and it has for its object the provision of means, in combination with such a balance, whereby the net weight of the object or material upon the scales may be read directly upon the indicating dial or drum, thereby avoiding the necessity of subtracting the tare from the gross weight shown by the dial, as heretofore.

In practicing my invention I provide spring-balance scales, which may be of any well-known or hereafter-to-be-devised construction, with means for changing the effective action of the spring or system of springs upon the indicating-dial in order to adjust the reading in such a manner as to show the net weight—that is, the dial shows direct the true weight of the object, the tare being eliminated.

The invention consists of the combination of parts and details of construction of spring-balance scales hereinafter described and claimed, and shown in the accompanying drawings, in which—

Figure 1 is a view, partly in section, of a spring-balance furnished with my improvements, the load-support, which may be of any well-known construction, being omitted; and Fig. 2 is a detail showing a modification of the tare-adjusting mechanism and its indicating-dial.

Referring to the drawings, A is the casing of a spring-scale of that type now known as the "Boston" scale and to which type the invention is more especially applicable, such casing having an opening for exposing the weight or value indications on a drum or dial $a$, journaled in the casing. A frame B supports the counterbalance-springs C of the scales, these springs having means, such as rods $c$, for connection to a load-support, which may be a pan or platform, but is shown as a hook or draft-rod connection $c'$, located centrally of a rod $c^2$, to the ends of which the rods $c$ are connected. A connection is shown for communicating the weight effect of the object to be weighed upon the springs to the weight-indicating drum or dial $a$, this connection consisting in the present instance of a rack and pinion D, operated by a rod $d$ at each end of the drum and adapted to be connected with the load-support by a transverse rod $d'$.

Upon the under side of frame B levers E are fulcrumed, preferably between lugs $e$, springs C being connected to the outer and preferably longer arms of the levers at $e'$. It will thus be seen that the load-support instead of being suspended from a rigid part of the frame is carried by levers E. The other arms of the levers E approach near to each other and terminate in rounded ends or knobs $e^2$, adapted for engagement with the tare-adjusting device F. The fulcrums $e$ may be at any desired point along the length of levers E, but are preferably placed as shown to produce a multiplication of two.

The tare-adjusting device F, as shown in Fig. 1, consists of a piston $f$, mounted in a suitable housing $f'$ upon frame B and bearing upon knobs $e^2$ of levers E. The adjustment is effected by a screw $f^2$ working within the housing and having a central extension or boss $f^3$ at its lower end conically pointed or otherwise suitably formed for engagement with a concaved bearing in piston $f$. At its upper or outer end screw $f^2$ is enlarged and formed into a knurled knob $f^4$, and below the knob is a scale or series of tare-graduations $f^5$, adapted to register with a fixed index-mark $f^6$. The index-mark $f^6$ is shown as placed upon a fixed ring $f^7$, mounted upon the frame B and telescoping with the graduated flange $f^5$ to entirely inclose the upper part of device F; but any other form of index-mark or pointer may be used.

In the modification shown in Fig. 2 piston $f$ is acted upon by cam $f^8$, working within a bearing on the piston on a pivot $f^9$ and controlled by an operating-arm $f^{10}$. The arm $f^{10}$ carries a pointer $f^{11}$ traveling over an index-scale $f^{12}$.

It will be seen that by the tare-adjusting device the inner arms of levers E are depressed or elevated, thereby producing a reverse effect upon the outer arms of said levers to raise or lower the springs with their connections, and this adjustment will be indicated upon the dial $f^5$, (or $f^{12}$ in Fig. 2,) both of which are shown graduated to indicate tare in pounds and ounces and in amount up to five pounds. By this arrangement the receptacle in which the material is to be weighed may be placed upon the weight-support and weight-indicating dial brought to zero by manipulation of the tare-adjusting device. The indicating-drum will then show directly the net weight or price of the material placed in the receptacle, and the dial of the tare-adjusting device will show the tare in pounds and ounces.

While I have illustrated and described my invention as applied to one type of spring-balance scales, it will be understood that it is applicable to many other types and forms. Also many changes may be made in the form and details of construction of the device shown without departing from the scope of the invention, although it will be understood that the invention is especially applicable to price and weighing scales where there is a drum on which the indications are marked and in connection with which the springs are widely separated or located at the ends of the drum.

The indicator for indicating the amount of tare, it will be noted, is graduated in pounds and ounces. Thus the user may readily set the scale to weigh off the desired tare for vessels of uniform weight or to weigh off a known proportion of material for which a price is not to be charged. In constructing this part of the apparatus it will be noted that the tare-indicator has been made relatively large, and even with the screw adjustment a single turn of the indicator will suffice to indicate several pounds.

Having thus described my invention, what I claim as new, and desire to secure by Letters Patent, is—

1. In scales, the combination of a frame, suspension-levers pivoted to said frame, counterbalance-springs connected with said levers, a load-support connected with said springs, an indicator, a connection for communicating the weight effect upon said springs to said indicator, a piston working in said frame and bearing upon said levers, and an adjustable pressure device operative upon said piston.

2. In scales, the combination of a system of pivoted suspension-levers, counterbalance-springs connected to corresponding arms of said levers, a load-support connected with said springs, a weight-indicator, a connection for communicating the weight effect upon said springs to said weight-indicator, and an adjusting device operative upon the other arms of said levers.

3. In scales, counterbalance-spring mechanism, a tare-adjusting device in operative relation thereto and comprising a housing, a piston mounted in said housing, a screw-thread device operative upon said piston, a dial to indicate the amount of said tare adjustment, and connections intermediate the piston and counterbalance-spring mechanism for communicating the tare adjustment to the latter.

4. In scales, the combination with an indicating-drum, a goods-support and counterbalancing-springs at opposite ends of the drum of means for adjustably supporting said springs at their upper ends, means for simultaneously adjusting said supporting means and an indicator for indicating the adjustment; substantially as described.

5. In scales, the combination with an indicating-drum, a goods-support, connections for rotating the drum by the movement of the goods-support and counterbalancing-springs at opposite ends of the drum, of adjustable supports for the upper ends of the springs and a central adjusting device for said supports; substantially as described.

6. A spring-scale having two distensible spiral springs which support the load, two like spring-levers, one arm of each being coupled to the upper end of its spring, a tare-adjusting screw, and means between said screw and the arms of the spring-levers for simultaneously and uniformly lifting both springs to regulate the tare.

7. A spring-scale having a draw-bar from which the load is suspended, a cross-head on said bar, two like distensible upright springs coupled below to said cross-head, two spring-levers, one arm of each of which is coupled to the upper end of said springs and means for rocking or turning said spring-levers simultaneously about their respective fulcrums for raising and lowering the springs, said means embodying a screw for regulating tare.

WILLIAM H. SANDERSON.

Witnesses:
E. A. SMITH,
GEO. SCHWARZ.